US008838718B2

(12) United States Patent
Almeida

(10) Patent No.: US 8,838,718 B2
(45) Date of Patent: Sep. 16, 2014

(54) VIRTUAL EMAIL METHOD FOR PREVENTING DELIVERY OF UNDESIRED ELECTRONIC MESSAGES

(75) Inventor: John Almeida, Richmond, CA (US)

(73) Assignee: UnoWeb Inc., Emeryville, CA (US)

(*) Notice: Subject to any disclaimer, the term of this patent is extended or adjusted under 35 U.S.C. 154(b) by 145 days.

(21) Appl. No.: 13/594,796

(22) Filed: Aug. 25, 2012

(65) Prior Publication Data

US 2012/0317222 A1   Dec. 13, 2012

Related U.S. Application Data

(63) Continuation-in-part of application No. 12/751,522, filed on Mar. 31, 2010, now Pat. No. 8,280,967, and a continuation-in-part of application No. 11/623,300, filed on Jan. 15, 2007, now abandoned.

(51) Int. Cl.
*G06F 15/16* (2006.01)
*G06Q 10/10* (2012.01)
*H04L 12/58* (2006.01)

(52) U.S. Cl.
CPC .............. *G06Q 10/107* (2013.01); *H04L 51/12* (2013.01); *H04L 51/28* (2013.01)
USPC ............ 709/206; 709/203; 370/329; 370/338

(58) Field of Classification Search
CPC ......... H04L 12/58; H04L 51/18; H04L 51/29; G06Q 10/107
See application file for complete search history.

(56) References Cited

U.S. PATENT DOCUMENTS

| 6,161,129 | A | 12/2000 | Rochkind |
| 6,591,291 | B1 | 7/2003 | Gabber et al. |
| 6,973,481 | B2 | 12/2005 | MacIntosh et al. |
| 8,280,967 | B2 * | 10/2012 | Almeida ........................ 709/206 |
| 8,560,621 | B2 * | 10/2013 | Rawat et al. .................. 709/206 |
| 8,595,495 | B2 * | 11/2013 | Mayer ............................ 713/170 |
| 2002/0188689 | A1 | 12/2002 | Michael |
| 2003/0200334 | A1 * | 10/2003 | Grynberg ....................... 709/245 |
| 2004/0156495 | A1 * | 8/2004 | Chava et al. .................. 379/392 |
| 2004/0196858 | A1 * | 10/2004 | Tsai et al. ...................... 370/401 |
| 2004/0249901 | A1 * | 12/2004 | Wallace et al. ............... 709/207 |
| 2005/0044156 | A1 * | 2/2005 | Kaminski et al. ............. 709/206 |
| 2007/0260693 | A1 * | 11/2007 | Cardone et al. ............... 709/206 |

* cited by examiner

*Primary Examiner* — Afsar M Qureshi
(74) *Attorney, Agent, or Firm* — Louis Ventre, Jr.

(57) ABSTRACT

A method is used to filter an electronic message using virtual email sent to a server using a virtual email address created by the server for a recipient-identified. The virtual email address comprises a sender identification in combination with the recipient's non-encoded email address. The server identifies the email recipient using the recipient's non-encoded email address, identifies the email sender as authorized, stores the email sender's identification, stores email comprising the virtual email address; enables the recipient to access the email; enables the recipient to create a virtual email address, receives the virtual email; receives a second electronic message from a non-user-identified sender at the server, responds to the non-user-identified sender requesting an answer that only a human could provide; and, receives the answer from the non-user-identified sender and if the answer is correct, then creates an electronic account on the server for the non-user-identified.

12 Claims, 8 Drawing Sheets

|  Folder — 500  | eMail Sender — 502 | Message — 504 |
|---|---|---|
| james (101) | myemail-james@emailserver.com | hello 1 |
|  | myemail-james@emailserver.com | hello 2 |
|  | myemail-james@emailserver.com | hello 3 |
| maria (102) | myemail-maria@emailserver.com | hello 1 |
|  | myemail-maria@emailserver.com | hello 2 |
|  | myemail-maria@emailserver.com | hello 3 |
| joao (104) | myemail-joao@emailserver.com | hello 1 |
|  | myemail-joao@emailserver.com | hello 2 |
| cheng (106) | myemail-cheng@emailserver.com | hello 1 |

FIG.5

|   | Delete — 612 | Archive — 610 | eMail Sender — 502 | Message — 504 |
|---|---|---|---|---|
| 1 | ☐ | ☐ | myemail-james@emailserver.com | hello 1 |
| 2 | ☐ | X | myemail-james@emailserver.com | hello 2 |
| 3 | ☐ | X | myemail-james@emailserver.com | hello 3 |
| 4 | X | ☐ | myemail-maria@emailserver.com | hello 1 |
| 5 | ☐ | X | myemail-maria@emailserver.com | hello 2 |
| 6 | ☐ | ☐ | myemail-maria@emailserver.com | hello 3 |
| 7 | ☐ | ☐ | myemail-joao@emailserver.com | hello 1 |
| 8 | ☐ | ☐ | myemail-joao@emailserver.com | hello 2 |
| 9 | ☐ | ☐ | myemail-cheng@emailserver.com | hello 1 |

FIG.6

| 6 | ☐ | ☐ | myemail-maria@emailserver.com | hello 3 |
| 7 | ☐ | ☐ | myemail-joao@emailserver.com | hello 1 |
| 8 | ☐ | ☐ | myemail-joao@emailserver.com | hello 2 |
| 9 | ☐ | ☐ | myemail-cheng@emailserver.com | hello 1 |

| james | myemail-james@emailserver.com | hello 2 |
| | myemail-james@emailserver.com | hello 3 |
| maria | myemail-maria@emailserver.com | hello 2 |

VIRTUAL EMAIL METHOD FOR PREVENTING DELIVERY OF UNDESIRED ELECTRONIC MESSAGES

CROSS-REFERENCE TO RELATED APPLICATIONS

This application is a continuation-in-part of application Ser. No. 12/751,522, filed Mar. 31, 2010, now U.S. Pat. No. 8,280,967, issued Oct. 2, 2012, which is a continuation-in-part of application Ser. No. 11/623,300, filed 15 Jan. 2007, now abandoned, both of which are hereby incorporated by reference herein in their entirety.

TECHNICAL FIELD

In the field of electrical computers and digital processing systems using multicomputer data transferring, a means and steps enables collaborative processing of data by the computers or digital data processing systems including processing user data in response to a demand to transfer data between the computers and more particularly a method where an email recipient assign a virtual email account to each email sender thus preventing deliver of unsolicited and undesired electronic messages.

BACKGROUND ART

An email is subdivided into two parts by the "@" character, and they are: the first part before (left) the "@" character is the recipient's email address; and the second part (right) after the "@" character is the email server domain—name of the email server. Once a email sender sends a email to a email recipient, the sending server will parse the email and send it to the receiving email server, the server domain indicated at the right of the "@" sign. Once the email server receives the email it will match it against email recipient indicated on the left of the "@" sign.

Many vendors of electronic mail servers, as well as many third-party vendors, offer spam-blocking software to detect, label and sometimes automatically remove spam. Presently, there exist many methods for detecting, labeling and removing spam.

A representative method is taught in the U.S. Patent publication 20030200334 ('334 publication). The '334 publication teaches a method where the recipient's email is encrypted and the encrypted part is concatenated with the sender's email information thus hiding the recipient's email and exposing the sender's email.

The '334 publication on one hand hides the recipient's email and on the other hand exposes the sender's email to spammer. Furthermore, the '334 publication requires complex and resource extensive public-encryption software and hardware for the purpose of encrypting and decrypting emails.

SUMMARY OF INVENTION

A method is used to filter an electronic message using virtual email sent to a server using a virtual email address created by the server for a recipient-identified. The virtual email address comprises a sender identification in combination with the recipient's non-encoded email address. The server identifies the email recipient using the recipient's non-encoded email address, identifies the email sender as authorized, stores the email sender's identification, stores email comprising the virtual email address; enables the recipient to access the email; enables the recipient to create a virtual email address, receives the virtual email; receives a second electronic message from a non-user-identified sender at the server, responds to the non-user-identified sender requesting an answer that only a human could provide; and, receives the answer from the non-user-identified sender and if the answer is correct, then creates an electronic account on the server for the non-user-identified.

Optionally, the server: accepts an email sent to the user's virtual email address by an unknown sender when the email address used contains a user-identified filter; adds a parameter to the virtual email address to enable it to recognize the position of the identification name of the sender and the position of the user's email address within the virtual email address; forms the virtual email address it can recognize by concatenating the identification name of the sender and the user's email address; and notifies an unknown sender that an electronic account has been created for him on the server.

The server may allow an unknown sender to send an email to a user at a virtual email address. First the virtual email address used has an identification of the non-user-identified sender and contains the recipient's email address, provided the recipient's email is not encoded and provided that the recipient's email address is an ID used by the email recipient's server to identify the email recipient in the recipient's email server. Next, the virtual email address includes user-identified filter recognized by the server to allow email sent to the user by the non-user-identified sender to be received at the email server for the user.

The server may also recognize a parameter in the virtual email address used by the unknown sender when the parameter identifies the position within the virtual email address of the name of the non-user-identified sender, the user's email address, and the user-identified filter.

The invention may take the form of a computer program product, which is a computer usable medium that comprises a computer readable program code embodied therein, which implements the above steps of the invention.

Technical Problem

If the email recipient has the email address of "myemail@emailserver.com," then in this context the recipient email address is "myemail" and the email server domain is "emailserver.com." Anyone can send emails to the "myemail" recipient. Currently, the only way to stop unwanted emails is by installing filters in the server domain "emailserver.com" or by reconfiguring the server's email software to block unwanted emails.

Existing solutions to unwanted emails are costly, time consuming and faulty. For the fact that any sophisticated email spammer, and in the majority of the cases they are, will be able to find ways of working around filters and emails server's configurations. Basically, anyone possessing the recipients email address can send any number of emails to the email account and in most cases without any restriction whatsoever, that is, some email server use filters to filter out some incoming email and these filters varies from good to no avail. Actually, none are one hundred percent bullet proof against email spammers.

Solution to Problem

The present invention uses a process that involves dividing the recipient (left part before the "@" character) email address into at least two separate parts. The first part having the recipient's email address, the second part is the email sender code (sender ID). If a third part is present, it could be the email recipient preset filter.

The invention prevents blocked spam from using computer resources by saving a single copy of the email and relating all recipients to the single copy of the saved email. Duplicate emails are deleted. The email may or may not be a spam. But, if the sender correctly responds to the submitted question, then the saved email is copied and saved into the recipient's folder or database.

The invention to enables a non-user-identified sender to send an email to a user at a virtual email address.

Advantageous Effects of Invention

The invention is a superior method of stopping, filtering out unwanted emails (junk emails, spam emails, unsolicited emails, etc., henceforth called unwanted emails) without hindering the receipt of legitimate emails.

The present invention enables saving a single blocked email for a broad base of users without wasting resources, as is done when following the teachings of the prior art. The present invention further teaches the saving of a single email that is associated with a plurality of users without duplicating the email to each user, thus saving resources that would otherwise be wasted with blocked email spam.

The present invention may be used and implemented in a chat room communication system, like a social network. The electronic message may be a message sent to a plurality of users and instead of each user receiving the message, a single message is stored and a plurality of user IDs may be related to the single message.

BRIEF DESCRIPTION OF DRAWINGS

The accompanying drawings, which are incorporated in the form a part of this specification, illustrate preferred embodiments of the invention and, together with the description, serve to explain the principles of the invention:

FIG. 5 illustrates an email structure having virtual emails for each email sender to the receiver email account.

FIG. 6 illustrates a screen exemplary view for virtual email management involving a delete and archive processes.

FIG. 7 illustrates a general email folder after the delete and archive processes of FIG. 6.

FIG. 8 illustrates an individual folder after the delete and archive processes of FIG. 6.

DESCRIPTION OF EMBODIMENTS

Figure 1:
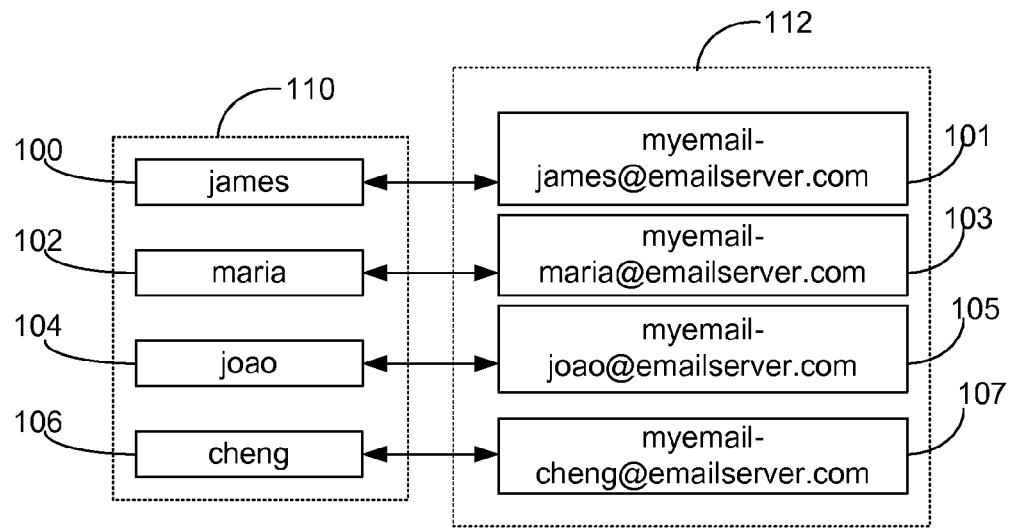
FIG. 1 illustrates assigning a virtual email address to an email sender.

The present invention is described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Since all the currently available solutions to unwanted email addresses involve filtering of unwanted emails in the email server side without having any consideration of the email recipient's concern, this process disclosed herein addresses the email recipient instead and not the email server's underlying technologies. The process involves dividing the recipient's email address into two or more parts.

EXAMPLE 1

For the email address "myemail@emailserver.com," the email recipient "myemail" assigns an email address for a specific email sender so as to permit the server to receive emails from the specific email sender. The email address is subdivided to identify a specific email sender, for example "Bob Daily."

The email recipient assigns a unique email address to "Bob Daily," such as "emailsender-bday@emailserver.com." It is unique because the only one having this email will be "Bob Daily." A third part of the email optionally sets a filter so all the emails bearing the filter are automatically received.

This process herein is called "virtual email."

Background of Email Communication

Figure 2:
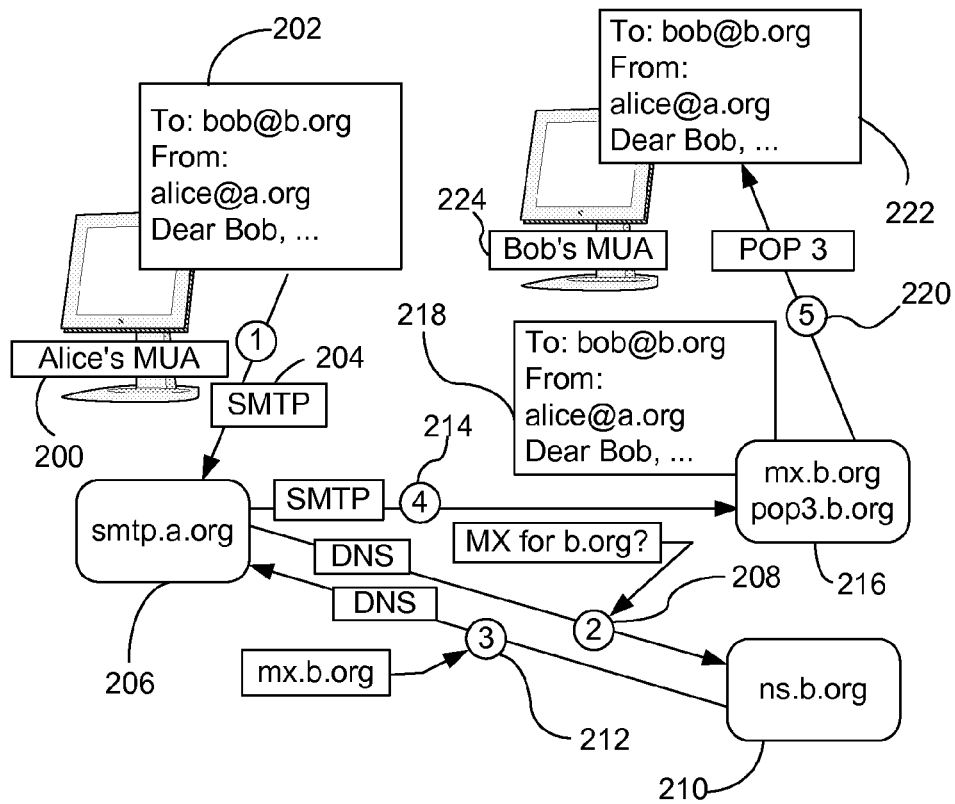
FIG. 2 illustrates a process of sending and receiving email.

FIG. 2 illustrates a traditional process involving email sending and receiving using the Internet. The diagram of FIG. 2 illustrates a typical sequence of events that takes place when Alice composes a message (202) using Alice's Mail User Agent (MUA) (200). She types in, or selects from an address book, the email address of her correspondent. She hits the "send" button, then:

Alice's Mail User Agent (200) formats the message of the Internet email format and uses the Simple Mail Transfer Protocol (SMTP) (204) to send the message to the local Mail Transfer Agent (MTA), in this case smtp.a.org (206), run by Alice's Internet Service Provider (ISP).

The Mail Transfer Agent, smtp.a.org (206), looks at the destination address (208) provided in the SMTP protocol (not from the message header), in this case bob@b.org. An Internet email address is a string of the form localpart@domain.example, which is known as a Fully Qualified Domain Address (FQDA). The part before the @ sign is the local part of the address, often the username of the recipient, and the part after the @ sign is a domain name. The Mail Transfer Agent looks up this domain name in the Domain Name System (DNS) to find the mail exchange (MX) servers accepting messages for that domain.

The DNS server for the b.org domain, ns.b.org (210), responds with an MX record listing the mail exchange servers for that domain, in this case mx.b.org (212), a server run by Bob's ISP: smtp.a.org (206) sends the message (214) to mx.b.org (216) using SMTP, which delivers it to the mailbox of the user bob (218).

Bob presses the "get mail" button in his Mail User Agent (224), which picks up the message using the Post Office Protocol (POP3) (220) then reads it (222).

This sequence of events applies to the majority of email users. However, there are many alternative possibilities and complications to the email system:

Alice or Bob may use a client connected to a corporate email system, such as IBM's Lotus Notes or Microsoft's Exchange. These systems often have their own internal email format and their clients typically communicate with the email server using a vendor-specific, proprietary protocol. The server sends or receives email via the Internet through the product's Internet mail gateway, which also does any necessary reformatting. If Alice and Bob work for the same company, the entire transaction may happen completely within a single corporate email system.

Alice may not have a Mail User Agent on her computer but instead may connect to a webmail service.

Alice's computer may run its own Mail Transfer Agent, so avoiding the transfer at step 1 (circle 1 in FIG. 2), that is at Simple Mail Transfer Protocol (SMTP) (204).

Bob may pick up his email in many ways, for example using the Internet Message Access Protocol, by logging into mx.b.org (216) and reading it directly, or by using a webmail service.

Domains usually have several mail exchange servers so that they can continue to accept mail when the main mail exchange server is not available.

Previously, many Mail Transfer Agents would accept messages for any recipient on the Internet and do their best to deliver them. Such Mail Transfer Agents are called open mail relays. This was important in the early days of the Internet when network connections were unreliable. If a Mail Transfer Agent couldn't reach the destination, it could at least deliver it to a relay that was closer to the destination. The relay would have a better chance of delivering the message at a later time. However, this mechanism proved to be exploitable by people sending unsolicited bulk email and as a consequence very few modern Mail Transfer Agents are open mail relays, and many Mail Transfer Agents will not accept messages from open mail relays because such messages are very likely to be spam.

Email Sender and Receiver Device

Figure 3:
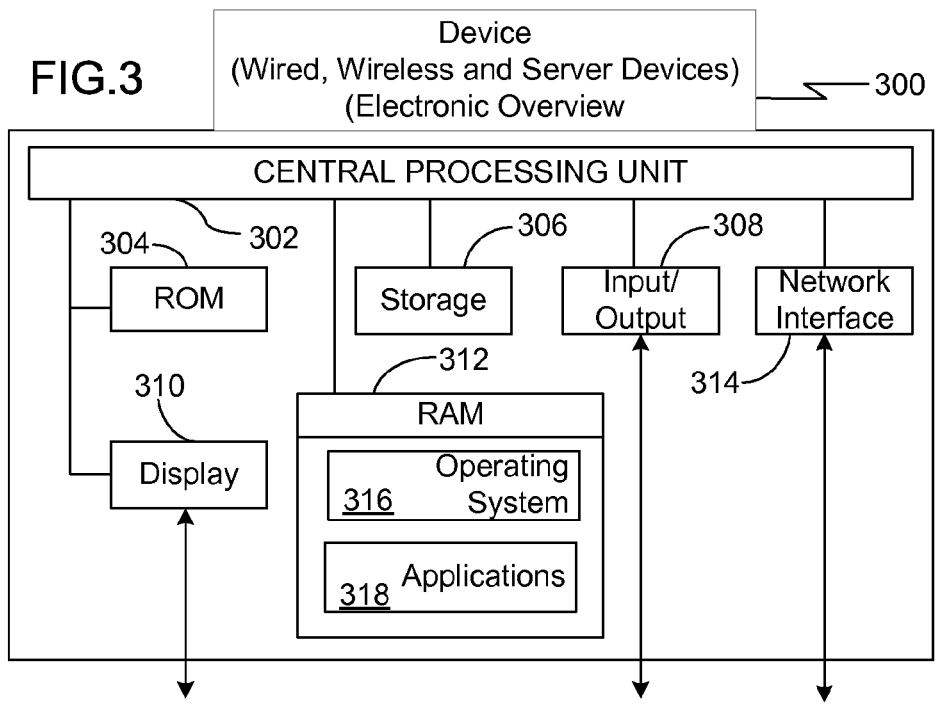
FIG. 3 illustrates a device for sending and receiving email.

FIG. 3 illustrates the electronic configuration for the devices used for the email communication process. Not all components may be shown for all devices or some devices may not have all of the shown components, still other devices may have more components than those presented in the drawings. This is to simplify the explanation of this invention and is not intended to obscure its meaning and mode of use.

The device (300) has a Central Processing Unit (302) (CPU), which is the brain of the device, controlling the device's functionalities. The device (300) has programming code means for its initialization at power up, which is usually stored in the permanent storage medium. In this case, it is in a Read Only Memory, ROM (304). It may be stored in any other permanent storage medium.

After power up, the Central Processing Unit (302) reads the programming code from the ROM (304) and starts processing it. It will load an Operating System (316) from the storage device (306) into the Read Access Memory (RAM) (312).

The Operating System (316) loads software applications (318) as needed into the RAM (312) and as applications (318) are executed, their interaction are presented to the user at the display (310). As needed, the Operating System (316) will receive input from other devices that are interfaced with the device (300) by using its Input Output port (308) (10), the devices may include, but are not limited to: mouse, keyboard, touch screen, etc.

The Operating System (316) sends output to other interfacing devices as well, such as but not limited to: screen, printer, audio card, video card, etc. When the device (300) receives or sends email, it will use the Network Interface (314).

A Preferred Embodiment

FIG. 1 illustrates virtual-email. To the left of FIG. 1, four email senders: james (100), maria (102), joao (104) and cheng (106) are illustrated in the address list (110) of the email recipient.

In order to avoid making an operable email link, the dot com in the email addresses described herein is replaced with a space dot com. It should be understood that the space dot com will be replaced with a dot com when made operable.

To the right, table (112) illustrates a table of virtual-email addresses and each of the email addresses is assigned to an email sender myemail-james@emailserver.com (101), myemail-maria@emailserver.com (103), myemail-joao@emailserver.com (105) and myemail-cheng@emailserver.com (107) shown on the address list (110).

The first email sender, myemail-james@emailserver.com (101) is assigned to the email sender james (100). Once james (100) sends an email to the email recipient "myemail," james will send the email using his virtual-email, myemail-james@emailserver. com (101). This is only assigned to james (100). If anyone spams that email address in the future, all the email recipient will have to do to stop the spamming is delete the virtual-email myemail-james@emailserver.com (101). This will permanently block future spam. If james (100) is an important contact of the email recipient, then a new virtual-mail can be created and the old one permanently deleted.

The server at which james (100) is sending the email to the email recipient myemail-james@emailserver.com (101) will do all the communication and have the email sent by james (100) directed to the server domain "emailserver.com." Once the "emailserver.com" receives the email it will first look for the email account "myemail." If it exists, it will further look for the sender id james (100) that is part of the recipient's email account. If found, the server will place the email in an appropriate folder/data base record assigned to james (100) and under the recipient's email address "myemail."

Regarding the sender id that is part of the email recipient's account, it can be separated from the recipient's email account by using any character (such as the dash "-" character), or it can be specified in terms of location within the recipient's email account.

For instance, the sender id for james (100) could as well have been "myemail000james" and would have been interpreted as ten positions "myemail000" of the recipient email account with the second part the sender id "james." Also, it can be based on the last part of the recipient's email account and the send id for james (100) could as well have been "myemailjames0" and in this case the last six position are reserved for the user id "james0". It can be setup in any conceivable way and only limited by the human imagination.

Although this is a very efficient means of stopping spammer, there will be times when it is desired to allow others to send emails without having a specific email assigned to them. For example, on printed business cards, or when the recipient assigns an email to a specific sender and forgets to set the receiver's virtual email account to receive the email. In both such cases, both senders are legitimate and if no other means are configured in the recipient's email server, the emails have to be returned.

When a business card identifies an email address of "myemail@emailserver.com", or a virtual email "myemail-friend@emailserver.com" and this is used to send an email to the "emailserver.com," then the invention allows receipt of such emails. Also, it is convenient to be able to allow the use a fixed email address in an advertisement, etc. Finally, in the circumstance when the recipient has given to the intended email sender a virtual email address for the recipient, but forgot to set the virtual email account to "myemail-friend," or didn't have the time to do so, etc. In these circumstances, the senders are legitimate senders. Since the objective of this invention is to stop spammers and not legitimate senders, an alternative process enables receipt of such email.

Once an email is received and a virtual email is not yet assigned or the email is received by the actual recipient's email account, the email server will be programmed to send an email back to the sender asking the sender to confirm its identity and the confirmation will be in a format that only a human can reply to. The process works as following: the email server will send an email to the email sender account with a link identifying the email; the user receive the email and clicks on the link; the link will direct the user to a page from the email server where it originated; the server will send a page to the email sender (user) asking for a reply that only a human can do; the user provides the reply; if the reply is the correct one, the email server will place the email into the recipient email box; and a new page is sent back to the user notifying that the email has been delivered. It can be done in many other ways as well and anyone with skill of the art will be able to conceive many other ways without departing from the true spirit and the teaching depicted herein.

Figure 4:
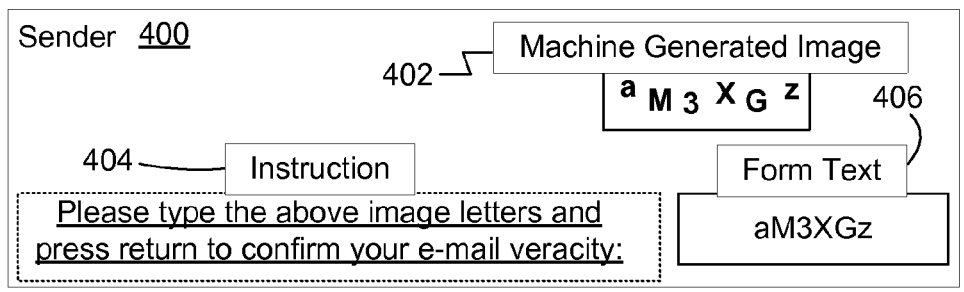
FIG. 4 illustrates a confirmation process for allowing a user without an assigned virtual email address to be authorized.

FIG. 4 illustrates a way of allowing mail from legitimate senders in the situations just described. The page or return email is sent to the sender (400) by the email server. It asks the sender to supply an answer. The page may have a machine generated image (402), a question, instruction (404), form text for the user to input the reply (406), or other means to test the legitimacy of the sender. For example, the image (402) contains machine generate character for a user to enter into the field for form text (406) and they are: "aM3XGz." After the sender replies to the page, once the email server receives it and if the supplied answer is the correct one, than the email will be placed into the recipient's email box. An image is used in the example, because a person will have no difficulty in replying, but a machine or computer would have difficulty in deciphering values placed on them. The image can be skewed before presenting it on a page, thus, making it even harder for an algorithm to guess its values.

Using means for receiving a human reply may involve the email server sending a page that will have images on it. For example, four images may be used (it can be any number): an elephant; a giraffe; a crocodile; and a falcon, and the question might be: "please select an elephant" and the user will select the image with the elephant and of the email server authenticates the answer, then places the email into the recipient's email box.

This method may employ a combination of two or more images as well. For example, asking the user to choose images that have a specific background, color, format, etc.

An alternative embodiment may be used for creating a filter that will allow wanted emails to be received by the email recipient without hindering legitimate users.

Figure 4A:
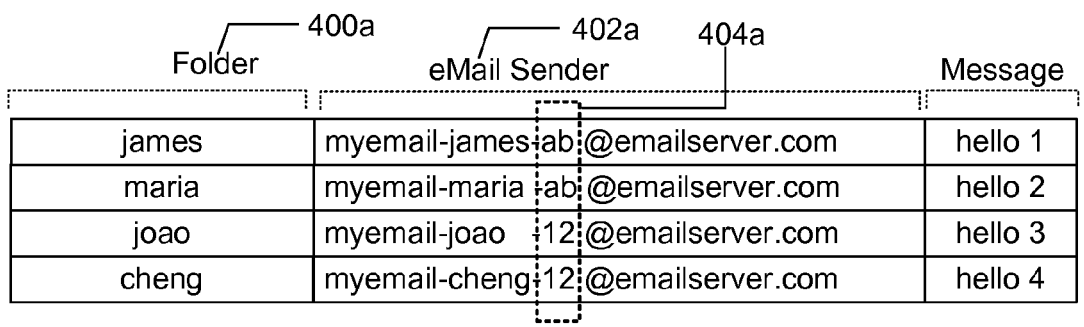
FIG. 4a illustrates a filter to automatically allow a non-registered virtual email sender to send email without being required to confirm.

FIG. 4a is a further illustration of FIG. 1. It illustrates the folder (400a) assigned to the each user as at FIG. 1. Each user has an additional extension assigned to each virtual email account (402a). For the first two users, it is "ab" and for the last two users, it is "12" (404a). The extension shown and assigned to each virtual email, is user (recipient) set as to allow the email server means for receiving legitimate emails before the virtual email account is setup.

In the exemplary explanation for two users, the filter "ab" is used and later changed to "12" for the last two users (it can as well be that they both are active filters). Since a spammer will need to know the extension to send unwanted emails, such knowledge will be unlikely to be available, especially since the email recipient may change the filter often and any old filter then becomes useless.

Two characters are shown for the extension and a short value for the sender's ID. It is to be understood that in reality it may be any length and it is preferable if they are more than just a few characters. By using the filter, the present invention offers a novel method wherein an email recipient is able to offer a virtual email to an email sender without having the email sender's ID stored in the email recipient's server and without requiring the email sender to correctly respond to question send to the email sender by the email sender's email server.

The first positions can be the sender ID and the filter field, just the sender ID or just the filter field, e.g., "123jamesmyemail." The first three characters "123" are the filter, the next five characters, james (100), are the sender ID and the rest of it is the receiver email account. For "123myemail," the first three characters comprise the filter and the rest of it the receiver email account. For "jamesmyemail," the first five characters james (100) identify the sender ID and the rest of it the receiver email account.

The email server can be setup to allow the email recipient to set one or more filters as well, for instance, a user setup two filters "abc" and "123." Then, all virtual emails having the filter fields of "abc" or "123" will be accepted.

Another example is: "jamesmyemail12@emailserver.com", "12myemailjames@emailserver.com", etc. For these two virtual emails "myemail-james-ab@emailserver.com" and "myemail-james-12@emailserver.com" are two distinct virtual emails; "james-myemail-ab@emailserver.com" and "james-myemail-12@emailserver.com" are two distinct virtual emails as well. Once again, any conceivable combination can be used and only limited by the human imagination. As long as the receiving email server is able to extract the recipient's email account from the virtual string, its purpose has been achieved.

In the case where extension filters are used for the purpose of allowing the receiving of incoming emails, they will allow email into the recipient's email box regardless of whether or not the sender's ID has been setup by the email recipient. Once any of the two aforementioned methods (for requesting confirmation of the use of a filter) are used, the recipient at the time of viewing the received emails will have the option to allow the email server to automatically create the virtual email for the email sender.

There may be a button or other means for asking permission from the email recipient to create the virtual email for the email sender. In the case of the first example "myemail@emailserver.com," the recipient will be given an option to setup a virtual email for the email sender and the email sender will be notified by email of the new virtual email accordingly.

FIG. 5 illustrates a further embodiment of the arrangement of FIG. 1 and it depicts one way in the process of organizing folders to each virtual email sender. There are four folders (500), one for each user. The first user, james (100), has three emails shown under message (504) column as assigned to his virtual email, under the eMail Sender (502) column. The second user, maria (102), also has three emails, joao (104) has two, and cheng (106) has one. This is just one way of organizing individual virtual email accounts and many more ways can be devised and implemented without departing from the true spirit of this invention.

FIG. 6 illustrates a single page where the email recipient can manage all of the virtual emails at once. There is a delete column (612); an archive column (610) which once selected the emails will automatically be assigned to each individual folders of FIG. 5. The next two columns are for the virtual email accounts shown under the eMail Sender (502) column and the virtual email messages, shown under message (504) column. The delete column (612) and the archive column (610) each have some boxes checked, the total of two for the delete column (612); the total of three for the archive column (610) and the total of five are left unchecked (rows 1 and 6-9).

FIG. 7 illustrates a new page list (700) that has only the last four rows from FIG. 6 that were not checked (deleted or archived) from the table of FIG. 6.

FIG. 8 illustrates the two folders of the FIG. 6 archive column (610) having a checked box in rows 2, 3 and 5. They were two message rows (800) with messages "hello 2" and "hello 3" for "james," namely rows 2 and 3 of FIG. 6; and one message row (802) for "maria" with one message "hello 2," namely row 5 of FIG. 6.

A preferred method includes a step of porting a current, in-use email address format (two parts email format) from the current email recipients' addresses book to a new address book having the new virtual email format, and a step of using the new virtual email format from the new created address book.

Figure 9:
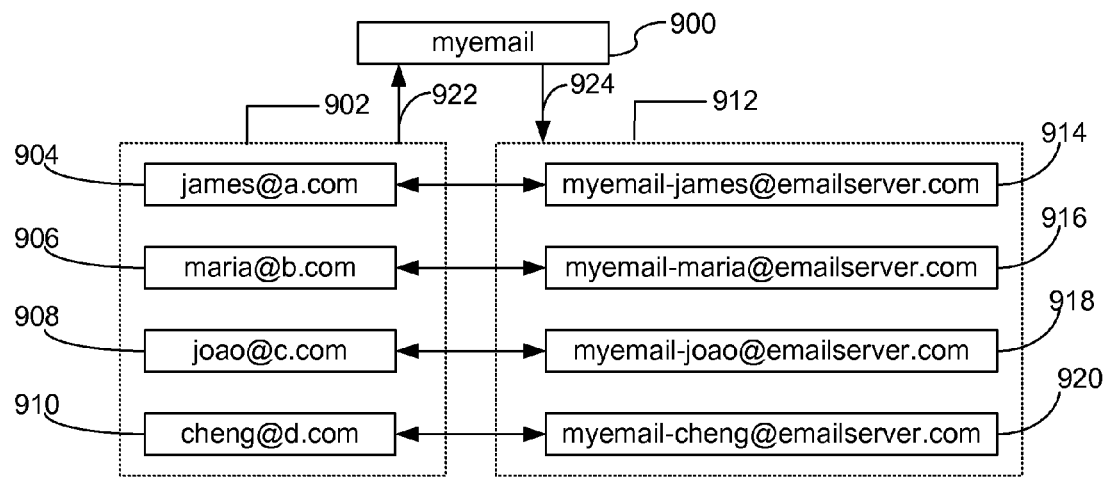
FIG. 9 illustrates porting an individual folder from a user's email address book using a traditional or current email format to this invention's format using default setup.

FIG. 9 illustrates such steps. To the left is an address book (902) currently used by user, myemail (900), and it lists four email addresses: james@a.com (904), maria@b.com (906), joao@c.com (908) and cheng@d.com (910). A new address book (912) shows each of these four email addresses ported to the new format using a default email recipient ID "myemail" followed by a dash and the sender ID, namely myemail-james@emailserver.com (914); myemail-maria@emailserver.com (916); myemail-joao@emailserver.com (918); and myemail-cheng@emailserver.com (920). The email server reads (922) the email address in the address book (902) and then converts it. After it is converted, the new email format is saved (924) to the new address book (912).

Figure 10:
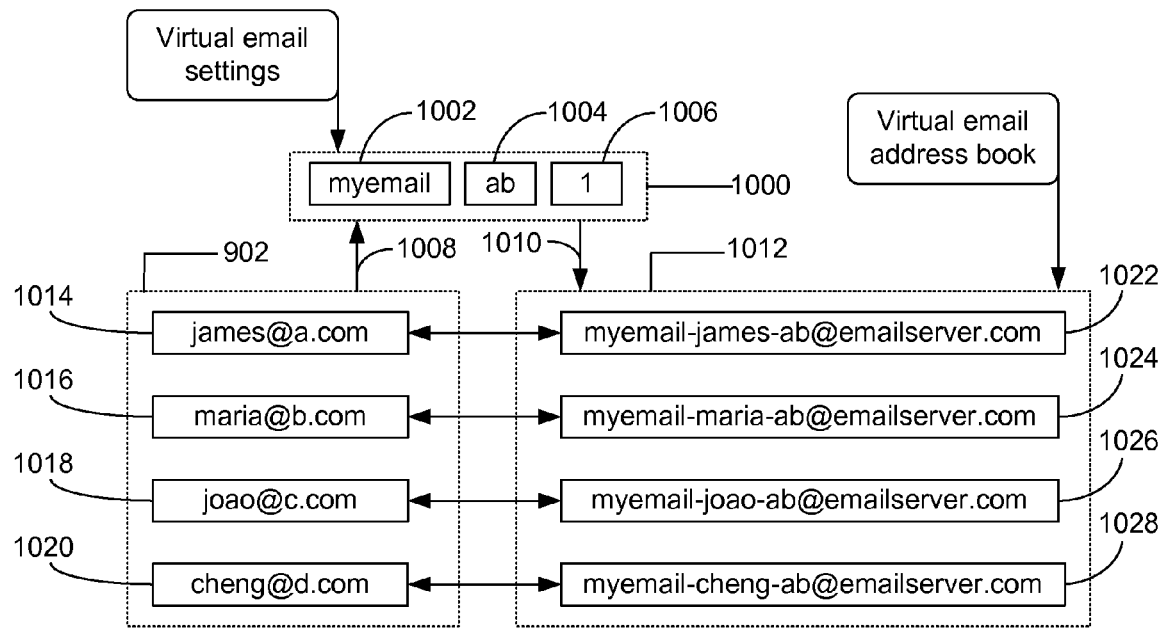
FIG. 10 illustrates the individual folder of FIG. 9 from a user's email address book being ported from the current email format to a format using virtual email settings.

FIG. 10 illustrates an alternative method and using a set of parameters (1000) including an email recipient, namely myemail (1002); a filter, namely ab (1004), and a setting, namely 1 (1006).

The setting, 1 (1006), is the parameter that indicates the format the server will use for the recipient email format. In FIG. 9, the default email recipient ID "myemail" to created the new email format and this is carried forward in FIG. 10. The setting parameter, namely 1 (1006) produces the same result as in FIG. 9, so that this is the default setting parameter. The setting parameter may be of any value and is not necessarily those shown for this example. As examples, a setting parameter may be "0" may be used to produce a virtual email recipient ID of "jamesmyemailab"; a setting parameter of "2" may be used to produce a virtual email recipient ID of "abjamesmyemail"; a setting parameter of "3" may be used to produce a virtual email ID of "abemailjames"; a setting parameter of "4" may be used to produce a virtual email ID of "ab-james-myemail"; etc. Once emails are ported to the new virtual email address book, the server may automatically generate emails and forward them to each recipient notifying of the new virtual email account setup therein.

An optional step includes preventing blocked spam/email from cluttering and wasting resources on the email recipient's email server. This is accomplished by having a single copy of the same email may be saved instead of a great number of blocked emails stored in the email server. This may be combined with a step of keeping a database record relating each email recipient's ID to the received email that comprises the same or similar content as the saved email; and with a step of deleting all other duplicated emails and retaining only a single saved copy.

Preferably, once an email is blocked, a question that only a human can answer is sent to the email sender and if the sender correctly responds to the submitted question the email is presented to the email recipient.

When each blocked email is stored in the server and if it is a spam, it will simply waste resources. This methods disclosed herein may be used to block spam as well to save resources. In this situation, where the email sender correctly responds to the question, the saved email is copied from the main storage where a single copy of the email exists and saved into the recipient's folder or database, the email may or may not be a spam. As well it may be that only a reference to the actual email is presented to the email recipient and the email server will simply present the email to the user without making a second copy of it. If it is implemented in a global database, the recipient's email server may simply receive a copy from the central server at the time the email recipient requests it, without actually saving a copy in the recipient's account, folder or database.

In the event where a single copy is saved and used to present to a group of users, the single email copy is presented to other users virtually and only a single copy may exist for one or more users without duplicating it to every owner-recipient. Therefore, it is preferably that a single email copy is saved. This enables presenting the single email copy to a plurality of email recipients; wherein the plurality of email recipients are associated with a single email copy. The body of the single email is the same for all users and the header changes to reflect each user.

It is preferable that every time an email is received and the email sender is not yet registered with the server, the electronic mail is blocked and a question is submitted to the electronic mail sender. Once the email sender correctly responds to the question, the email is stored into the email recipient's folder or database account. A spammer may send a great number of spamming-emails to a broad base of recipients, such as for example, the spammer may send thousands or even millions of emails. Thus, the invention may be used to stop spammers and to save resources that would otherwise be wasted on spam.

Based on this explanation, if the recipients are within a company or email provider, a lot of resources are potentially wasted since the blocked email will be stored for a certain period of time for each user before the email/spam is deleted from the email server to release resources. Preferred steps disclosed herein will save a received email and other new incoming emails will be compared with the saved email and if it is the same or of similar content, then the extra copies are deleted and the email recipient user's ID is added in a database table to have it related with to the first email, thus stopping the duplication of unwanted email and conserving the email server's resources. The mechanism to compare emails may be an artificial intelligence program to detect their content or it may be to compare their message body's content, or any other means that achieve the same result.

In case the content is similar or very close with just a few words or phrases that differ, the system is preferably intelligent enough to detect these small variations, save just the small variations into the recipient account, have an index pointer pointing to the location of these differences, and having the other content form the saved email. Then the saved email becomes a template for all users and the distinctive words or phrases are inserted in each email at the time the email is presented to the actual recipient. This mechanism may be used for other purposes besides emails.

For example, in the event that one email (or any other type of electronic document like a word processing page, spreadsheet pages, etc) is for example "this is a great day for a great vacation" and a second email states a similar phrase, such as "this is a great year for a great vacation," then and in that event only the words "year" and "day" differ. Recognizing this difference, the server saves the first email as is "this is a great day for a great vacation" and for the second email, the server saves only the word "year" while pointing to the first email body's content and pointing to the location where the word "day" starts and the number of characters to be replaced with the word "year."

The second email may be saved as "first_document_location:year:17:3" and this means "first_email_location" pointer to the first email location on the server (it may as well be a database table relationship) and the word "year" will be placed at the position "17" and at the position 17 three characters will be removed as indicated by "3." This is only one illustration and many more may be developed to offer the basic end result. This process may be used on any electronic document and including email. All such documents may belong to a single user or to a plurality of users.

Figure 11:
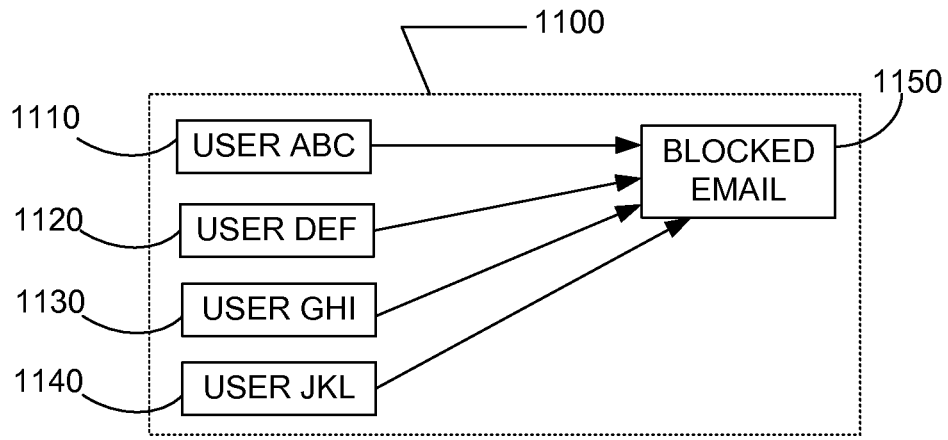
FIG. 11 illustrates a single copy of an email being saved and related to a plurality of users.
Figure 12:
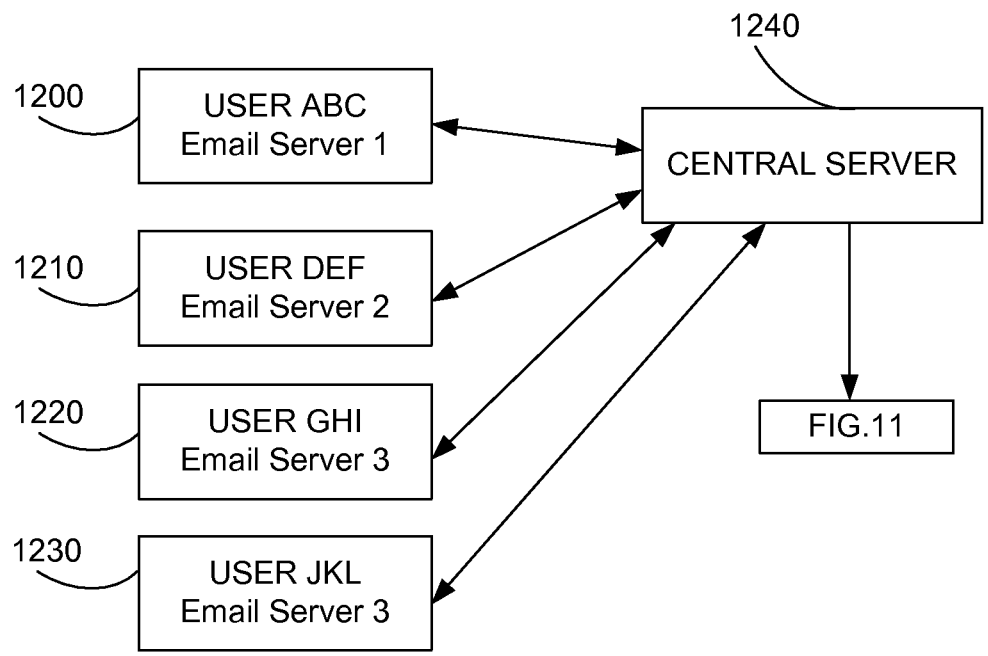
FIG. 12 illustrates an embodiment of FIG. 11 where each email recipient is located at distinct email servers.

FIG. 11 illustrates an exemplary process (1100) of saving a blocked email sent to multiple users comprising email recipients: USER ABC (1110), USER DEF (1120), USER GHI (1130) and USER JKL (1140). Each such email recipient received the same blocked email (1150). As discussed above, there is only one email instead of four emails that is saved for each of the recipient's folder or database. The resources savings becomes quite large especially since spammers send a great many emails to a broad base of users at a typical email provider. FIG. 11 illustrates a preferred embodiment using a single server and FIG. 12 illustrates an embodiment using a global base. In both exemplary embodiments, a single email is saved thus saving a great deal of resources that otherwise would not be saved using prior art methods. It should also be recognized that the electronic message does not have to be blocked. It can be a regularly received email.

FIG. 12 illustrates an implementation of a central server (1240). There are three email servers for four recipients or users: USER ABC Email Server 1 (1200); USER DEF Email Server 2 (1210); USER GHI Email Server 3 (1220); and USER JKL Email Server 3 for (1230). Once a blocked email is received by each such email server, the email server sends the blocked email to the central server (1240) for storage as in FIG. 11. Preferably, the central server (1240) receives the recipient's ID and the email from the recipient's email server and saves the recipient's ID. It then relates the recipient's ID to the saved email and if the email is a duplicate, the central server communicates with the recipient's email server to delete the duplicated copy stored therewith in memory or on a magnetic-storage means.

This embodiment may be implemented where the first copy of the email is saved with each server, the recipient's email server and the central server, or all saving may occur at the central server (1240). Alternatively, saving may be at a combination of the central server (1240) and the recipient's email servers sharing the resources by having some email in the central server (1240) and others in the email server where the email recipient has an account. The process may be implemented by a single server, the recipient's email server or the central server (1240), etc.

In the event that an unregistered sender sends an email to a recipient that is received by the recipient's email server. The recipient's email server then responds with a question to the sender that only a human can answer. When the sender provides the correct answer to the question sent by recipient's email server, then the recipient's email server requests from the central server (1240) the email and saves it to the recipient's email account at the recipient's email server, if it is not yet saved therein.

Alternatively, where the central server (1240) is programmed to save emails and to relate all recipients from a plurality of email servers to a single email copy of similar or identical emails, then the recipients' email servers may free their resources for purposes other than saving duplicated emails. The central server (1240) may save all the email for all email recipients from a plurality of recipient's email servers.

Where an email is one of multiple duplicate emails and a single copy resides at the central server (1240), then the single copy may became a virtual copy for all email recipients. The virtual copy may be assigned to the email recipients located at a plurality of email servers. Thus, a single email is presented as a virtual email to a plurality of email recipients, with the potential for each such email recipient to have an email account with distinct email servers. Each email recipient and each email server may be located at a distinct Internet/network address. Alternatively, each email server may be located at a single Internet/network address.

By having a combination of email server and a central server (1240), the process may be implemented on a global scale. The central server (1240) may or may not be an email server. Since spammers send email in a global scale, then email servers anywhere on the Internet may communicate with the central server (1240) to check for email or to send email to it.

Figure 13:
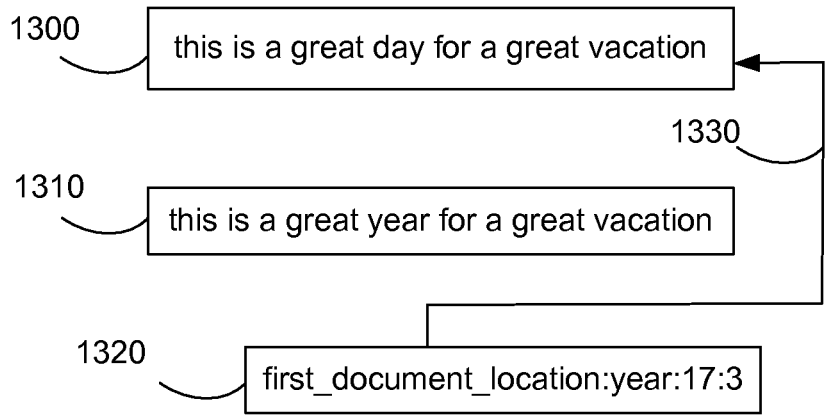
FIG. 13 illustrates an embodiment where two similar electronic documents are saved to two or more users and only the dissimilar words or phrase are saved.

FIG. 13 depicts a first document (1300), that is, a first email message. It comprises the phrase "this is a great day for a great vacation." FIG. 13 also depicts a second document (1310) comprising the phrase "this is a great year for a great vacation" and the second document (1310) is saved as "first_document_location:year:17:3" (1320). The "first_document_location" and an index or relationship (1330) to the first document are also saved.

Indexing may be in forms, such as a separate database table's field for the purpose of presenting an index to point to the first document or it may be folder's address where the first document is saved. The second document (1310) is not saved, only a reference for it is saved: "first_document_location:year:17:3" (1320).

The means of identifying the similarity between two or more documents may involve counting the words on each document and if the number of dissimilar words that don't appear between the two documents hits a threshold, for instance ten percent are dissimilar then the two contents are similar; or if said number hits a threshold that is higher or lower than a preset threshold, then the two documents are similar and the similar words or phrases are removed and saved for the secondary documents. Alternatively, the words that are not similar may be used to determine the threshold for the contents similarity or the contents dissimilarity.

In an alternative embodiment, a virtual email is automatically assigned by the server computer to a user once a first user links with a second user in an environment such as social network or any environment where users link to each other. For instance, a first user is called "userabc" and the first user "userabc" has an email on the server and the email address is "userabc@server.com." A second user is called "user123" and the second user "user123" has an email address on the server and the email is "user123@server.com." Once the first user, "userabc," links with the second user, "user123," then the server automatically creates a virtual email for the second user and the newly created virtual email is based on the first user's email, such as: "userabc-xyz@server.com."

Similarly, the same virtual email assignment would happen for the second user: the server automatically creates a virtual email for the first user that is based on the second user's email. So, in this example, the first user uses the second user's virtual email after the first user communicates with the second user; and the second user uses the first user's virtual email after the second user communicates with the first user.

If a single virtual email account is used for two users, the first user and the second user, then the email contains the identification of the two users and the server may then use this common virtual email for communication between the two users. For instance, an email for the first user and the second user may contain the identification of both users, such as: "userabc-user123@server.com". Once either user starts the process of sending an email to the other user, the server will use this common virtual email address and the server will store emails received by the first user "userabc" and sent by the second user "user123" in a distinct folder for the first user "userabc." Emails received by the second user, "user123," which are sent by first user "userabc," causes the server to store them in a distinct folder for the second user, "user123." This method and any other method taught herein may be used in a chat environment or any similar environment.

As a further example, a first user's new virtual email address is userabc-xyz@server.com. The first user and the second user may communicate using this new virtual email address, which may be recognized only by the server computer. After the first user or the second user selects a means to send an email to the other, then the server computer automatically selects the virtual email and uses it to send the email to both users. The virtual part of the email "xyz" may or may not be known to the first user or the second user. It may be known by just one user, or it may be known by both users, or it may be known only to the server computer. The virtual part "xyz" may be a random value assigned by the server computer or it may be the linked user's identification. For instance, it may be like: "userabc-user123@server.com" where "user123" is the second user's identification. The method may be further implemented to enable the server computer to automatically delete the virtual email after either of the two users disconnects from the linked relationship. Alternatively, the server computer may be programmed not to delete the virtual email automatically, but to require the first user to delete it. If the server computer assigns two virtual emails to both users, then the server computer may be programmed to delete both emails once the relationship between the first and the second user ends.

Figure 14:
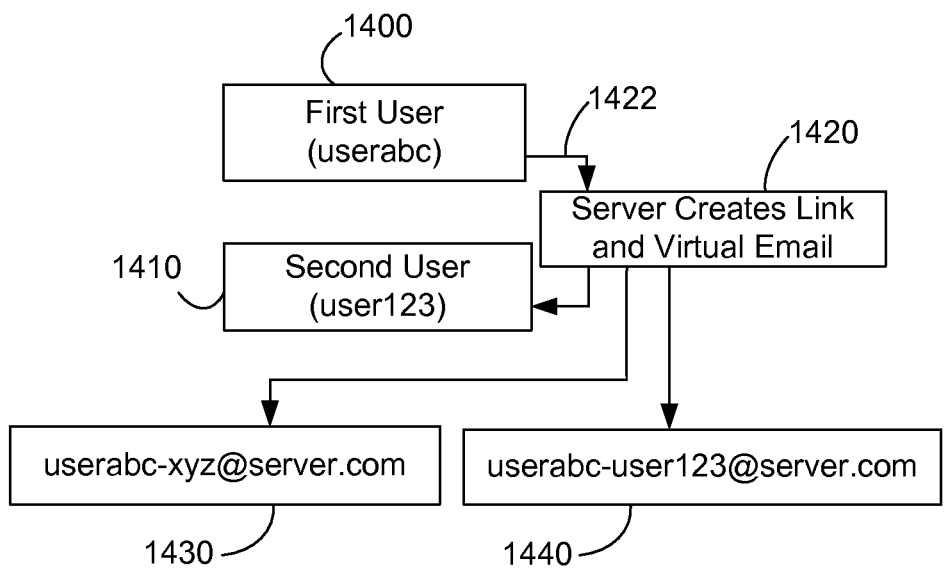
FIG. 14 illustrates an embodiment where the server creates a virtual email once a first user links with a second user.

FIG. 14 illustrates the process of the First User (userabc) (1400) requesting that the server create a link (1422), which results when the Server Creates Link and Virtual Email (1420) for the Second User (user123) (1410). Next, the server (1420) creates a virtual email using one of two formats: a first format where an extension "xyz" (random value) is used to create a virtual email address, userabc-xyz@server.com (1430); or a second format where the linked user, second user ID, "user123," is used to identify the second user in a virtual email address: userabc-user123@server.com (1440). The first format deals with a server issued extension and the second format deals with the linked user's identification being used to identify the second user.

In either format, the first user will use the virtual part to identify the second user. Alternatively, the server may create two virtual emails: one for the first user and another for the second user, instead of just one for both users. If only one virtual email is created using any described format, the server will use the two users' linking relationship to store content, email or attachments to each user in a distinct user's folder assigned and managed by the server. After the relationship between the two users ends, the server preferably deletes the virtual emails. The server might not delete the folder's content if it were desired to retain the folder's contents for archival or record purposes. Alternatively, the server might compact the folders and save them in a database. Alternatively, the server might simply delete the folders without doing any archiving of the folders contents.

Figure 15:
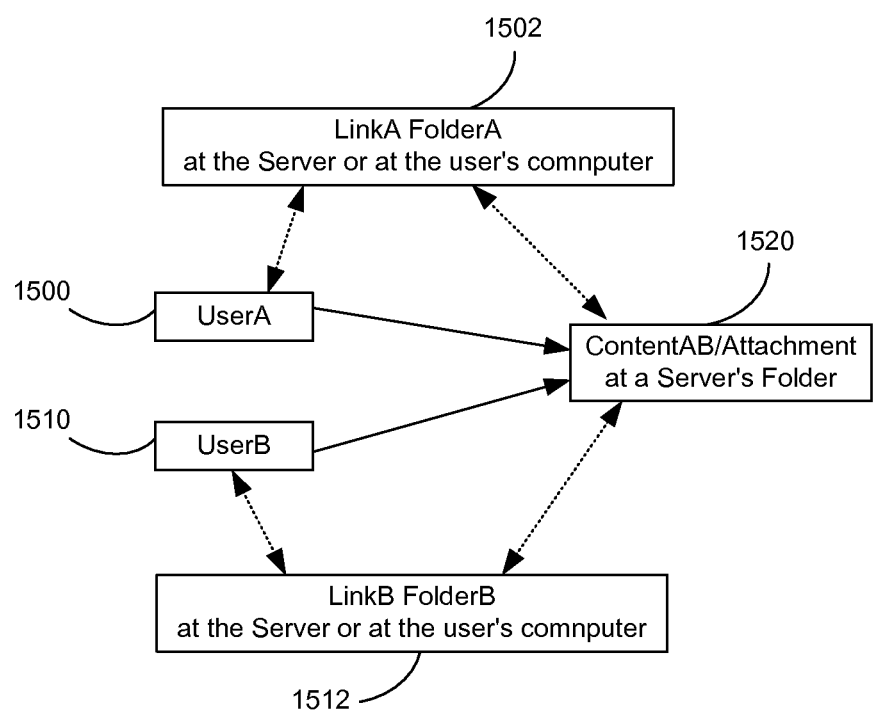
FIG. 15 illustrates an embodiment having a content/attachment assigned to two users and a single copy of the content resides on the server's storage medium.

FIG. 15 illustrates an alternative embodiment where the server is used to store an attachment for one or more users and only a single copy of the attachment resides in the server. For example when the attachment is related to two emails, one for each user or two emails to a single user, then the server preferably saves only one copy of the attachment and creates a link for each user or each email pointing to the saved copy. Once one user deletes the email containing the attachment or deletes the actual attachment or file, then the link from the user's email to the attachment is deleted by the user's computer (if implemented on the server computer, then the server computer does the deleting of the link). Preferably, the user's computer communicates with the server notifying the server of the deletion. The server then decrements a value in a counter associated with the attachment on the server. If the value is not zero, meaning that there is a link to another email, then the server computer does not delete the attachment. After the last user deletes the link to the attachment, then the last user's computer (if implemented on the server computer then the server computer does the deleting of the link) deletes the link from the last user's attachment and notifies the server computer of the deletion. When the email server decrements the counter and the counter's value is zero, meaning that no more user email is linked to the attachment, then the server computer deletes the attachment from its storage mechanism.

If it is a single user, then once the single user deletes the email containing the attachment, the user's computer (if implemented on the server computer then the server computer does the deleting of the link) communicates with the server computer and the server computer deletes the attachment since only one link is pointing to the attachment and the counter's value after the deletion of the link is zero.

The term attachment used in the above example is to be interpreted broadly to include the actual email, attachment, a file not associated with an email and stored in each user's computer and a single copy residing in the server computer.

The method described above may be implemented in a single server computer or in more than one computer, one computer per user or a combination of a server computer and one or more users in the server computer and one or more users in a computer controlled by the one or more users.

Alternatively, the method may be implemented only on the user's computer and a single file is stored in one folder and other folders will have a link to the file. The method can be implemented on a single computer for two different users as well, such as when two user's operate a single computer.

In an alternative embodiment, a method includes storing a single attachment copy assigned to two or more users. This method may be used to transfer a copy of a document from one location to other locations. For example, a user may place the file (attachment) into a folder (first folder) and the folder is associated with another folder (second folder), the first folder is associated with a first user and the second folder is associated with a second user (or both folders may be associated with a single user in a single computer or in a plurality of computers) and the first folder and the second folder are linked, that is, a document in the first folder will also be placed (saved) in the second folder.

In this particular arrangement, instead of having two copies of the same document, the server will store the document in a folder under the server's control and just place a first link from the first folder to the document at the server's folder and second link from the second folder to the document at the server's folder. A document's icon may appear on the first folder for a user viewing the first folder and on the second folder for a user viewing the second folder. The first folder and the second folder may function similarly to an email in an email server's folder, wherein the first folder is similar to a first email in an email server's first folder and the second folder is similar to a second email in an email server's second folder.

When a user deletes the first copy of the document at the first folder, this action will only delete the first link. A user deleting the second copy of the document from the second folder will delete the second link and since there are no more links to the actual document (attachment), the server deletes the document, or the server may save the document for record purpose before deleting it. The term "folder" is broadly defined to include e-mail folder or any kind of folder structure in a single computer, in multiple computers or in multiple storage units in a single computer or a plurality of computers.

FIG. 15 illustrates a first user, UserA (1500); a second user, UserB (1510); and a single content/attachment, ContentAB/Attachment at a Server's Folder (1520). The single content/attachment relates to the first user through a first link reference: LinkA FolderA at the Server or at the user's computer (1502), and to the second user through a second link reference: LinkB FolderB at the Server or at the user's computer (1512). The relationship is based on a link reference that refers to the single content/attachment: ContentAB/Attachment at a Server's Folder (1520), which is stored in the server.

The first link reference may reside at the first user's, UserA (1500), computer or at the server where the single content/attachment resides. The same is true for the second link reference, which may reside at the second user's computer or at the server where the single content/attachment, ContentAB/Attachment at a Server's Folder (1520), resides.

Once the first user, UserA (1500), accesses the first user's folder, the computer will use the first link reference and display to the first user the single content/attachment as an icon representing the single content/attachment. Once the first user clicks on the first link reference, then the first user's computer uses the first link reference and requests the single content/attachment from the server. The same explanation applies to the second user (1510), mutatis mutandis.

A counter (not shown) is preferably kept by the server to increment a value for the content indicating the number of relationships with a content. Once a relationship is assigned to multiple instances or multiple users, the server decrements the counter once the content is deleted by any one user. Once the counter reaches the value of zero, the server deleted the content, or the server archives the content and then deletes it from its folder. Thus, a user deletes the content from the user's folder, the user's computer deletes a link reference and communicates with the server informing the server that the link has been deleted. Then the server decrements the counter related to the content. If the counter's value is zero, the server deletes the content or archives the content and then deletes the content from the server's folder.

In accordance with the above description, a first method is one of filtering an electronic message using virtual email and a virtual email address. It includes steps of: providing a server, the server comprising a computer, receiving at the server an electronic message sent by an email sender to an email recipient; the server creating a virtual email address for a recipient-identified sender to use to send the electronic message to the recipient, the virtual email address comprising a sender identification in combination with the recipient's non-encoded email address; the server identifying the email recipient using the recipient's non-encoded email address; the server identifying the email sender as an authorized email sender when the email sender's identification is in an email to the recipient; storing the email sender's identification on the server in an email recipient's account so that it is related to the recipient's non-encoded email address; storing email in an account for the email recipient the account comprising the virtual email address; giving the email recipient access the email on the server; enabling the email recipient to create a virtual email address for assignment to a specific email sender; receiving a first electronic message using the virtual email address; receiving a second electronic message from a non-user-identified sender at the server, wherein the second electronic message comprises a second virtual email address, the second virtual email address comprising an identification of the non-user-identified sender in combination with the non-encoded recipient's email address, wherein the virtual email address for the non-user-identified is not registered with the recipient's email server; responding to the non-user-identified sender requesting an answer that only a human could provide; and, receiving the answer from the non-user-identified sender and if the answer is correct, then creating an electronic account on the server for the non-user-identified sender and storing the second electronic message in the newly created electronic account.

This first method may include steps of enabling the server to accept an email sent to the user's virtual email address by a non-user-identified and unknown sender if the user's virtual email address comprises a user-identified filter that; and if the user-identified filter is preset by the email recipient and pre-registered at the recipient's email account before the non-user-identified and unknown sender sends the email; and, redesignating the non-user-identified and unknown sender as a user-identified sender.

This first method may further include steps of enabling the server to add a component to the virtual email address, the component comprising a parameter identifying the position of the identification name of the sender and the position of the user's email address within the virtual email address; and, enabling the server to recognize a parameter in the second email address, the parameter comprising an identification of the position of the identification name of the sender and the position of the user's email address within the second virtual email address.

This first method may further include steps of enabling the server to create the email address configured such that the identification name of the sender and the user's email address in the virtual email address are concatenated without a separating character between them; and, enabling the server to recognize the second electronic message configured such that the identification name of the non-user-identified sender and the user's email address in the second virtual email address are concatenated without a separating character between them.

This first method may further include the step of notifying the non-user-identified sender that an electronic account has been created for the non-user-identified sender on the server.

In accordance with the above description, a second method describes steps for using virtual email to allow a non-user-identified sender to send an email to a user at a virtual email address. These steps include: providing an email server, comprising a computer for receiving an email sent by a non-user-identified sender to a virtual email address for a user, wherein the virtual email address comprises: an identification of the non-user-identified sender; the recipient's email address; wherein the recipient's email is not encoded; wherein the recipient's email address is an ID used by the email recipient's server to identify the email recipient in the recipient's email server; and, the server recognizing a user-identified filter at the email server; allowing an email sent to the user by the non-user-identified sender to be received at the email server for the user; receiving an email at the email server sent to the virtual email address for the user by a sender; the server recognizing the user-identified filter when it is part of the non-user-identified virtual email; and, enabling the email recipient to preset the identified filter for virtual email to the email recipient.

This second method may further include the server recognizing a parameter in the virtual email address, the parameter comprising an identification the position within the virtual email address of the identification name of the non-user-identified sender, the user's email address, and the user-identified filter.

In accordance with the above description, the invention may take the form of a computer program product, comprising a non-transitory computer usable medium having a computer readable program code embodied therein. The computer readable program code is adapted to be executed on a server and causes the server to implement a method for converting an email address to a virtual email address. This method comprises the steps of: providing a server for creating a sender-specific virtual email address for a user; accessing an email from an address-book of the two-parts email format wherein the two-parts email format comprises the email-server domain and the email recipient's email address and retrieving an email; creating said sender-specific virtual email address for a user by combining components comprising the recipient's email address and an identification of the sender from the accessed email, wherein the recipient's email address is not encoded; and, creating a virtual email account on the server designating the sender by the sender-specific virtual email address.

The computer program product may also include code that implements one or more steps of: enabling the server to add to the sender-specific virtual email address a parameter. The parameter comprises an identification of the position of the user's email address and an identification of the sender; sending an email to the user notifying the user of the sender-specific virtual email address; enabling the server to assign the same recipient-identified to two or more virtual email senders; enabling the server to assign two or more recipient-identified filters to the same email recipient; enabling the server to recognize a single sender's identification from two or more email senders when each email sender has a distinct recipient-identified filter; enabling the server to assign the same recipient-identified filter to two or more virtual email senders; enabling the server to recognize two or more recipient-identified filters for an email recipient; and, enabling the server to recognize a single sender's identification used by two or more email senders when each email sender has a distinct recipient-identified filter.

In accordance with the above description, a fourth method includes steps of a server automatically assigning a virtual email address to a first user in an environment such as social network or at any environment where the first user links to a second user; the server automatically assigning a virtual email address to the second user after the first user links to the second user, said automatic assigning occurring without first user intervention with the server in the step of the server automatically assigning the virtual email address; the virtual email address comprising the first user's identification and a filter assigned by the server to the second user; wherein the filter is a random value used by the server to identify the second user or is the second user's identification; the server using the server assigned virtual email address without the first user or the second user having any knowledge of the second user's virtual email address; enabling the first user and the second user to communicate using the server assigned virtual email address; and, once the first user disconnects from the second user, the server automatically deleting the virtual email that was assigned to the second user and without the first user's intervention with the server in the deleting process.

In accordance with the above description, a fifth method includes steps of a server automatically assigning a virtual email to a user in an environment such as social network or at any environment where one user link to another user; the server automatically assigning a virtual email to the second user after the first user links to the second user; the virtual email comprising the first user's identification and a filter assigned by the server to the second user or the second user's identification; wherein the filter is a string or a value used by the server to identify the second user; enabling the first user and the second user to communicate using the server assigned virtual email; and, once the first user disconnects from the second user, the server automatically deleting the virtual email that was assigned to the second user.

In accordance with the above description, a sixth method includes steps of a server automatically assigning a virtual email to a user in an environment such as social network or at any environment where one user links to another user; the automatically assigning a virtual email to the second user after the first user links to the second user; the virtual email comprising the first user's identification and a filter assigned by the server to the second user or the second user's identification; wherein the filter is a string or a value used by the server to identify the second user; and, enabling the first user and the second user to communicate using the server assigned virtual email.

In accordance with the above description, a seventh method includes storing a single copy of content (file, email or email attachment) on a server where the content is related to one or more users; assigning a link to each user from the user's computer folder to the content; the server responding to a click on the link by presenting the content to the user as if the content were present in the user's computer folder; the user's computer folder may reside at a server or at the user's computer; the server deleting the content on the server in response to being notified by the user's computer that the user has deleted the link reference representing the content from the user's computer folder.

In accordance with the above description, an eighth method includes a computer storing a single copy of a content (file, email or email attachment) on the computer, a first folder and a second folder on the computer, storing the content in the computer's first folder; the user or the computer copying the content from the first folder and storing the content to the second folder; the computer providing a link related to the content on the first folder and storing the link in the second folder, the link enabling the computer to present the content to the user as if the content were present on the computer in a second folder; and, the user accessing the second folder and the user's computer displaying the content to the user as if the content resided in the second folder based on the link stored in the second folder that is related to the content stored in the first folder. The method further comprising the steps of: enabling the user to delete the link representing the content from the second folder and the computer deleting the link from the second folder. The method further comprising the steps of: the computer deleting the content from the first folder.

In accordance with the above description, a ninth method includes a server storing a single copy of content (file, email or email attachment) and the content is related to one or more users and each user having a link from the user's computer folder to the content and the link enables the server to present the content to the user as if the content were present on the user's computer folder; the user's computer folder may reside at a server or at the user's computer; a content stored at the server; a first user having at the first user's computer folder a first link to the content at the server, wherein the first link represents the content and enables the first user's computer to present the content to the first user as if the content resided at the first user's computer folder; a second user having a second link at the second user's computer folder, wherein the second link represents the content and enables the second user's computer to present the content to the second user as if the content resided at the second user's computer folder; the first user accessing the first user's computer and the first user's computer displaying the content to the first user as if the content resided at the first user's computer folder; and, the second user accessing the second user's computer and the second user's computer displaying the content to the second user as if the content resided at the second user's computer folder. The method further comprising the steps of: enabling the first user to delete the first link representing the content from the first user's computer folder and the computer deleting the first link.

The method further comprising the steps of: the second user deleting the second link reference representing the content from the second user's computer folder and the second user's computer deleting the second link and the second user's computer communicating with the server notifying the second link deletion and the server deleting the content.

The above described methods of saving a single document for a group of users are of a great use once a document like an email is sent to a group of recipients within a single organization or a group of user located in a single email server since the complete document is the same and there is not having a need to duplicate the document for every recipient. Not all recipients are required to be in located in a single email server, the methods may be implemented where only those users in a single email server will have links representing the actual document and all other recipients on other servers may receive the actual document, or the method may be implemented so that a link is presented to all recipients even if they are served by more than one server and the server is connected to a network, such as the Internet.

Overview

A preferred method assigns a single electronic message to a plurality of recipients comprising the steps of: providing a server, comprising a computer, for receiving a first electronic message sent by an email sender to a first email recipient; wherein the first email recipient comprising a first ID; storing the received first electronic message; receiving a second electronic message sent by an electronic message sender to a second email recipient; wherein the second email recipient comprising a second ID; retrieving the first received electronic message and comparing the first received electronic message with the second received electronic message; and if the first electronic message and the second electronic message are the similar or the same then storing the second ID in a database and relating the second ID with the first electronic message. The method further comprising the step of: registering the first electronic message recipient and the second electronic message recipient with two distinct servers.

In another preferred embodiment, a single electronic message is assigned to a plurality of recipients. This method comprises steps of: providing a computer for storing a first electronic document; comparing a second electronic document with the first electronic document and if the contents of the first electronic document and the second electronic document are of similar nature; identifying words or phrases present on the second electronic document that differ from the first electronic document; and saving on the second electronic document only words or phrases of the second electronic document that don't appear on the first electronic document and instructions for the replacement of the words or phrases of the first electronic document that don't appear in the second electronic document.

In another preferred embodiment, a single electronic message is assigned to a plurality of recipients. This method comprises steps of: providing a computer for storing a first electronic document; comparing a second electronic document with the first electronic document and if the contents of the first electronic document and the second electronic document are of similar nature; identifying words or phrases present on the first electronic document that differ from the second electronic document; and saving on the first electronic document only words or phrases of the first electronic document that don't appear on the second electronic document and instructions for the replacement of the words or phrases of the second electronic document that don't appear in the first electronic document.

An alternative embodiment includes a method of filtering an electronic message using virtual email. The method comprises steps of: providing a server, comprising a computer, for receiving an electronic message sent by an email sender to an email recipient; creating a virtual email address for a recipient-identified sender to use to send the electronic message to the recipient, the virtual email address comprising a sender identification in combination with the recipient's non-encoded email address comprising a virtual email; wherein the recipient's non-encoded email address represents the actual email recipient's email address part of the email used by the email recipient's server to identify the email recipient at the email server; wherein the email sender's identification is used by the recipient's email server as to enable the server to identify the email sender as an authorized email sender to send the email to the email recipient; wherein the email sender's identification is stored in the email recipient's email server and related to the recipient's non-encoded email address; creating an electronic account on the server for storing email using the virtual email address, wherein the electronic account is accessible by the recipient and not the sender, wherein the virtual email creation is initiated by the email recipient, and wherein the created virtual email address is assigned to a specific email sender; receiving the electronic message using the virtual email address; the specific email sender sending the electronic message using the virtual email address to a destination consisting of a storage location in the electronic account; receiving a second electronic message from a non-user-identified sender at the server, wherein the second electronic message comprises a second virtual email address, the second virtual email address comprising an identification of the non-user-identified sender in combination with the non-encoded recipient's email address; wherein the virtual email address for the non-user-identified is not registered with the recipient's email server; responding to the non-user-identified sender requesting an answer that only a human could provide; and receiving the answer from the non-user-identified sender and if the answer is correct, then creating an electronic account on the server for the non-user-identified sender and storing the second electronic message in the newly created electronic account.

As described above, a preferred method of virtual email allows a non-user-identified sender to send an email to a user at a virtual email address. This method comprises the steps of: providing an email server, comprising a computer, for receiving an email sent by a non-user-identified sender to a virtual email address for a user, wherein the virtual email address comprises: an identification of the non-user-identified sender; the recipient's email address; wherein the recipient's email is not encoded; wherein the recipient's email address is an ID used by the email recipient's server to identify the email recipient in the recipient's email server; and, a user-identified filter that is recognized by the email server to allow email sent to the user by the non-user-identified sender to be received at the email server for the user; receiving an email at the email server sent to the virtual email address for the user by a sender; and wherein the user-identified filter is part of the non-user-identified virtual email; and wherein the identified filter is preset by the email recipient and pre-registered at the recipient's email account prior to a non-user-identified can send virtual email to the email recipient.

The methods described herein may take the form of a computer program product implementing the steps described herein. The computer program product comprises a non-transitory computer usable medium having a computer readable program code embodied therein. The computer readable program code is adapted to be executed on a server causes the server to implement a method for converting an email address to a virtual email address. This method comprises the steps of: providing a server for creating a sender-specific virtual email address for a user; accessing an email from an address-book of the two-parts email format wherein the two-parts email format comprises the email-server domain and the email recipient's email address and retrieving an email; creating said sender-specific virtual email address for a user by combining components comprising the recipient's email address and an identification of the sender from the accessed email, wherein the recipient's email address is not encoded; and, creating a virtual email account on the server designating the sender by the sender-specific virtual email address.

Another embodiment is a method for assigning a single electronic message to a plurality of recipients. The method comprises the steps of: providing a server, comprising a computer, for receiving a first electronic message sent by an electronic message sender to a first electronic message recipient; receiving a second electronic message sent by an electronic message sender to a second electronic message recipient; comparing the two electronic messages' contents and if the contents of the two electronic messages are of similar nature; identifying words or phrases present on the second electronic message that differ from the first electronic message; and saving for the second electronic message recipient only the words or phrases of the second electronic message that don't appear on the first electronic message and instructions for the replacement of the words or phrases of the first electronic message that don't appear in the second electronic message.

Another embodiment is a method for automatically assigning a virtual email to a second user after the first user links with the second user; providing a server; enabling a server to automatically assign a virtual email to the second user after the first user links to the second user and without the first user intervention with the server in the process of the server creating the virtual email; the virtual email comprising the first user's identification and a filter assigned by the server to the second user; wherein the filter is a random value used by the server to identify the second user or the second user's identification; the server assigned virtual email is used only by the server and without the first user or the second user may not having any knowledge of the second user's virtual email, or they may having knowledge of the virtual email; enabling the first user and the second user to communicate using the server assigned virtual email; and, once the first user disconnects from the second user, the server automatically deleting the virtual email that was assigned to the second user or archiving the virtual e-mail's contents then deleting the virtual e-mail and without the first user's intervention in the deleting process.

Another embodiment is a method for automatically assigning a virtual email to a second user after the first user links with the second user; providing a server; enabling a server to automatically assign a virtual email to the second user after the first user links to the second user; the virtual email comprising the first user's identification and a filter assigned by the server to the second user; wherein the filter is a value used by the server to identify the second user; enabling the first user and the second user to communicate using the server assigned virtual email; and, once the first user disconnects from the second user, the server automatically deleting the virtual email that was assigned to the second user.

Another embodiment is a method for automatically assigning a virtual email to a second user after the first user links with the second user; providing a server; enabling a server to automatically assign a virtual email to the second user after the first user links to the second user; the virtual email comprising the first user's identification and a filter assigned by the server to the second user; wherein the filter is a value used by the server to identify the second user; and, enabling the first user and the second user to communicate using the server assigned virtual email.

Another embodiment is a method for assigning a single content to one or more users, the method comprising the steps of: providing a server computer; the server computer storing a content; a first user having a first user's folder; a second user having a second user's folder; the first user's folder having a first link to the content; and the second user's folder having a second link to the content; the first user clicking on the first link and the server presenting the content to the first user as if the first user's folder contained the content. The method further comprising the step of: the server creating a counter for the content, and the counter comprising a value indicating the number of links to the content. The method further comprising the steps of: enabling the first user to delete the content-link reference from the first user's folder; the server computer receiving a signal indicating that content-link reference was deleted by the first user; the server decrementing the counter and if the counter reaching the value of zero, deleting the content or archiving the content then deleting the content from the server's storage medium. The method further comprising the step of: the second user deleting content-link reference from the second user's folder; the server decrementing the counter and if the counter reaching the value of zero, deleting the content or archiving the content then deleting the content from the server's storage medium.

Another embodiment is a method that enables an email recipient to assign individual virtual emails to each email sender to the email recipient and the assigned virtual email having at least two parts. That is, one part being the recipient email account (it can be either the first or any other part of the virtual email) and the other part is the sender ID for the sender.

In an embodiment, there are three parts, one part is the recipient email account, another part is the sender ID and the third part is the recipient preset filter. Once a recipient's preset filter is active, all the received virtual emails for the recipient are automatically assigned to the recipient's account.

As noted, alternative embodiments may arrange parts in any order, so that the recipient email account may be the first, the last, the middle part or any section of the virtual email. Two parts may be made one part for the recipient's email account and the other part for the email recipient's preset filter.

An alternative embodiment includes software means for sending a page to an email sender prompting the sender to provide an answer that cannot be answered by a machine. The page is sent automatically by an email server whenever the email sender sends an email message to the recipient's main email account or to a virtual account that is not yet setup.

The invention may be used in such a way that is not exactly as described in this disclosure but that produces similar results or even be used in entirely different settings but the end result still becomes obvious from the teachings of this invention. An email message as described herein may be any electronic message. The term "electronic message" is intended to be any kind of message handled by a computer.

Although the present invention and its advantages have been described in detail, it should be understood that various changes, substitutions and alterations could be made herein without departing from the true spirit and scope of the invention as defined by the appended claims. Moreover, the scope of the present application is not intended to be limited to the particular embodiments of the process, machine, manufacture, composition of matter, means, methods, computer software and steps described in the specification. As one of ordinary skill in the art will readily appreciate from the disclosure of the present invention, processes, machines, manufacture, compositions of matter, means, methods, computer software, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, computer software or steps.

What is claimed is:

1. A method of filtering an electronic message using virtual email comprising the steps of:
   providing a first server, the first server comprising a computer, and the first server configured for receiving an electronic message sent by an first email sender to an email recipient identified by the first email sender;
   creating a first virtual email address to use to send the electronic message to the email recipient, the first virtual email address comprising a sender identification in combination with a non-encoded email address of the email recipient, the non-encoded email address comprising a part of an actual email address of the email recipient used by a second server receiving email sent to the email recipient to identify the email recipient at the second server;
   identifying the email recipient using the non-encoded email address of the email recipient;
   enabling the first server to identify the first email sender as an authorized email sender when an identification of the first email sender is in an email message sent to the email recipient;
   storing the identification of the first email sender on the first server in an account for the email recipient so that the identification is related to the non-encoded email address of the email recipient;
   storing in the account of the email recipient an email message, said email message comprising the first virtual email address;
   enabling the email recipient to access the email message;
   creating a second virtual email address when requested by the email recipient, said second virtual email address assigned to a second email sender;
   receiving a second electronic message using the second virtual email address;
   receiving a third electronic message from a non-user-identified sender at the first server, wherein the third electronic message comprises a third virtual email address, the third virtual email address comprising an identification of the non-user-identified sender in combination with the non-encoded email address of the email recipient, wherein the third virtual email address for the non-user-identified sender is not registered with the first server;
   responding to the non-user-identified sender requesting an answer that only a human could provide; and
   receiving the answer from the non-user-identified sender and if the answer is correct, then creating an electronic account on the server for the non-user-identified sender and storing the third electronic message in said electronic account.

2. The method according to claim 1, further comprising the steps of:
   accepting an email message sent to the first virtual email address by a non-user-identified and unknown sender:
      if the first virtual email address comprises a user-identified filter; and
      if the user-identified filter is preset by the email recipient and pre-registered in the account before the non-user-identified and unknown sender sends the email; and
   redesignating the non-user-identified and unknown sender as a user-identified sender.

3. The method according to claim 1, further comprising the step of:
   creating the first virtual email address as a concatenation of the sender identification and the non-encoded email address of the email recipient, said concatenation having no separating character between the sender identification and the non-encoded email address of the email recipient; and
   recognizing the third electronic message when the third electronic message is configured such that the sender identification and the email address of the first recipient in the third virtual email address are concatenated without a separating character between them.

4. The method according to claim 1 further comprising the step of notifying the non-user-identified sender that an electronic account has been created for the non-user-identified sender on the server.

5. A method of virtual email allowing a non-user-identified sender to send an email message to a user at a virtual email address, the method comprising the steps of:
provinding an email server, the email server comprising a computer, the email server receiving the email message sent by the non-user-identified sender to the virtual email address for the user, wherein the virtual email address comprises:
an identification of the non-user-identified sender;
a non-encoded email address for the user; said non-encoded email address consisting of: the recipient's email address; and a user-ID, said user-ID consisting of what the email server uses to identify the user; and
a user-identified filter that is recognized by the email server to allow the email message to be received at the email server for the user;
receiving an email message at the email server sent to the virtual email address;
recognizing at the email server the user-identified filter when said user-identified filter is part of the non-user-identified virtual email address; and
enabling the email recipient to preset the user-identified filter.

6. A computer program product, comprising a non-transitory computer usable memory having a computer readable program code embodied therein, said computer readable program code adapted to be executed on a server causes the server to implement a method for converting an email address to a virtual email address, said method comprising the steps of:
providing a server for creating a sender-specific virtual email address for an email recipient, said sender-specific virtual email address associated with a sender;
accessing an email address from an address-book, said email address consisting of a two-parts email format, said two-parts email format consisting of an email-server domain and an email address for the email recipient, wherein the email address is not encoded and comprises a part used by the server to identify the email recipient;
retrieving an email message from the sender;
creating said sender-specific virtual email address for the sender by combining the email address for the email recipient and an identification of the sender from the email message; and
creating a virtual email account on the server designating the sender by the sender-specific virtual email address.

7. The computer program product of claim 6 that causes the server to implement a method, the method further comprising the step of sending an email to the email recipient notifying the email recipient of the sender-specific virtual email address.

8. The computer program product of claim 6 that causes the server to implement a method, the method further comprising the step of assigning a recipient-identified filter to two or more virtual email senders.

9. The computer program product of claim 6 that causes the server to implement a method, the method further comprising the step of assigning two or more recipient-identified filters to the one email recipient.

10. The computer program product of claim 6 that causes the server to implement a method, the method further comprising the step of recognizing a single sender's identification from two or more email senders when each email sender has a distinct recipient-identified filter.

11. The computer program product of claim 6 that causes the server to implement a method, the method further comprising the step of recognizing two or more recipient-identified filters for an email recipient.

12. The computer program product of claim 6 that causes the server to implement a method, the method further comprising the step of recognizing a single sender's identification used by two or more email senders when each email sender has a distinct recipient-identified filter.

\* \* \* \* \*